(12) United States Patent
Carlisle et al.

(10) Patent No.: US 7,088,497 B1
(45) Date of Patent: Aug. 8, 2006

(54) OPTICAL DEVICE WITH POLARIZATION DIVERSITY MODULE

(75) Inventors: Clinton B. Carlisle, Palo Alto, CA (US); Jahja I. Trisnadi, Cupertino, CA (US); Edward D. Huber, Portola Valley, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 166 days.

(21) Appl. No.: 10/731,955

(22) Filed: Dec. 10, 2003

Related U.S. Application Data

(60) Provisional application No. 60/434,024, filed on Dec. 17, 2002.

(51) Int. Cl.
*G02B 26/00* (2006.01)
*H04J 14/06* (2006.01)

(52) U.S. Cl. .............. 359/337.1; 359/494; 359/337.21; 398/65; 398/87

(58) Field of Classification Search ................ 359/494, 359/337.1, 337.2, 337.21, 337.5
See application file for complete search history.

(56) References Cited

U.S. PATENT DOCUMENTS

| | | | | |
|---|---|---|---|---|
| 5,960,133 A | * | 9/1999 | Tomlinson | 385/18 |
| 6,275,623 B1 | * | 8/2001 | Brophy et al. | 385/14 |
| 6,804,428 B1 | * | 10/2004 | Garrett et al. | 385/24 |
| 6,876,475 B1 | * | 4/2005 | Trisnadi et al. | 359/237 |
| 2002/0067888 A1 | * | 6/2002 | Morozov et al. | 385/37 |
| 2002/0196492 A1 | * | 12/2002 | Trisnadi et al. | 359/124 |
| 2003/0108284 A1 | * | 6/2003 | Danagher et al. | 385/24 |
| 2003/0223748 A1 | * | 12/2003 | Stowe et al. | 398/48 |

OTHER PUBLICATIONS

Roger Allan "Highly Accurate Dynamic Gain Equalizer Controls Optical Power Precisely", Electronic Design, Feb. 4, 2002 by Reprint Services.

* cited by examiner

*Primary Examiner*—Drew A. Dunn
*Assistant Examiner*—Mark Consilvio
(74) *Attorney, Agent, or Firm*—Okamoto & Benedicto LLP

(57) ABSTRACT

In one embodiment, an optical device includes a polarization diversity module configured to receive an optical input signal and output a first optical output signal and a second optical output signal having the same polarization state. This helps ensure light beams propagating in the optical device have the same polarization state, thereby mitigating the effects of polarization-dependent loss in the optical device. In one embodiment, the optical device comprises an optical dynamic gain equalizer with a light modulator.

14 Claims, 3 Drawing Sheets

OPTICAL DEVICE WITH POLARIZATION DIVERSITY MODULE

CROSS-REFERENCE TO RELATED APPLICATION

This application claims the benefit of U.S. Provisional Application No. 60/434,024, entitled "OPTICAL DEVICE WITH POLARIZATION DIVERSITY MODULE", filed on Dec. 17, 2002, incorporated herein by reference in its entirety.

BACKGROUND OF THE INVENTION

1. Field of the Invention

The present invention relates generally to optical devices, and more particularly, but not exclusively, to devices employed in optical signal transmission.

2. Description of the Background Art

Light is an electromagnetic wave. As such, light has a corresponding electric field vector that can be resolved into two orthogonal polarization states, such as a "P-component" and an "S-component" with respect to a reference surface. Light may also be polarized such that it only has one component. Light that only has a P-component is known as "P-polarized", while light that only has an S-component is known as "S-polarized".

Polarization-dependent loss refers to the sensitivity of an optical device to the polarization state of an input signal, such as a light beam. An optical device with relatively high polarization-dependent loss would exhibit varying losses depending on the polarization state of the input signal. That is, the optical device may have one loss value for the S-component of the input signal and another loss value for the P-component of the input signal. In telecommunications applications where input signals typically have polarization states that fluctuate randomly, polarization-dependent loss may result in variations of the output signal levels, for example. That is, polarization state fluctuations may produce magnitude fluctuations that can be mistaken as data and give rise to bit-errors.

From the foregoing, a technique for mitigating the effects of polarization-dependent loss in optical devices is highly desirable.

SUMMARY

In one embodiment, an optical device includes a polarization diversity module configured to receive an optical input signal and output a first optical output signal and a second optical output signal having the same polarization state. This helps ensure light beams propagating in the optical device have the same polarization state, thereby mitigating the effects of polarization-dependent loss in the optical device. In one embodiment, the optical device comprises an optical dynamic gain equalizer with a light modulator.

These and other features of the present invention will be readily apparent to persons of ordinary skill in the art upon reading the entirety of this disclosure, which includes the accompanying drawings and claims.

The use of the same reference label in different drawings indicates the same or like components. Drawings are not necessarily to scale unless otherwise noted.

DETAILED DESCRIPTION

In the present disclosure, numerous specific details are provided such as examples of devices, components, and methods to provide a thorough understanding of embodiments of the invention. Persons of ordinary skill in the art will recognize, however, that the invention can be practiced without one or more of the specific details. In other instances, details that are well-known in the art are not shown or described to avoid obscuring aspects of the invention.

The present invention relates to techniques for mitigating the effects of polarization-dependent loss in optical devices. Although embodiments of the invention are described using a dynamic gain equalizer with a grating light valve as an example, the invention is not so limited and may be used in optical devices in general. Additionally, unless otherwise noted, the term "signal" is used in the present disclosure to refer to an optical signal, such as a light beam.

Figure 1:
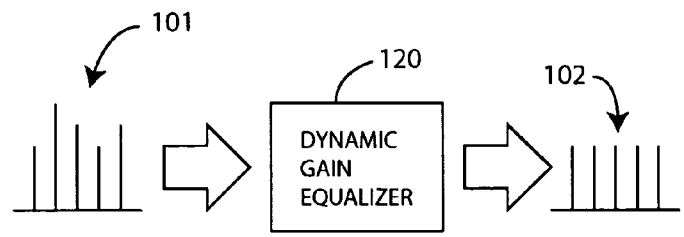
FIG. 1 schematically shows an optical dynamic gain equalizer.

FIG. 1 schematically shows an optical dynamic gain equalizer 120. Equalizer 120 is an optical device that receives an optical input signal 101 and outputs an optical output signal 102. Input signal 101 may comprise a plurality of wavelength-multiplexed component signals. That is, input signal 101 may comprise a plurality of component signals of varying wavelengths. A first component signal has a first wavelength, a second component signal has a second wavelength, and so on. Each component signal may serve as a channel for carrying information. Input signal 101 may be a dense wavelength division multiplexed (DWDM) signal, for example. Generally speaking, equalizer 120 dynamically adjusts the power levels of the component signals of input signal 101 such that the component signals of output signal 102 will have substantially uniform power levels or other power level distributions.

Equalizer 120 may be of the same type as the 2200 DGE dynamic gain equalizer commercially available from Silicon Light Machines, Inc. of Sunnyvale, Calif. Equalizer 120 may also be of the type disclosed in commonly-assigned U.S. application Ser. No. 10/051,972, entitled "Method And Apparatus For Dynamic Equalization In Wavelength Division Multiplexing", filed by Jahja I. Trisnadi et al. on Jan. 15, 2002. The just mentioned U.S. Application is incorporated herein by reference in its entirety.

Figure 2A:
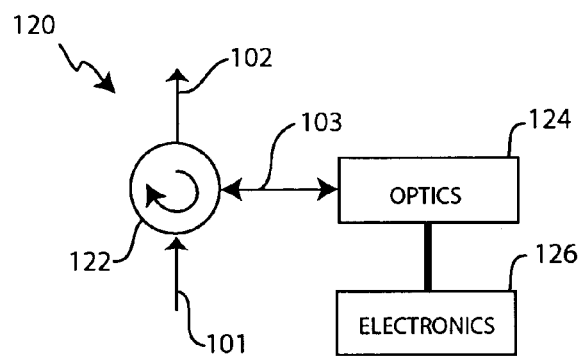
FIG. 2A schematically shows the components of the dynamic gain equalizer of FIG. 1.

FIG. 2A schematically shows the components of a dynamic gain equalizer 120. As shown in FIG. 2A, equalizer 120 may comprise a circulator 122, an optics module 124, and an electronics module 126. Circulator 122 may be a conventional optical circulator configured to route input signal 101 to optics module 124, and to route the output of optics module 124 out as output signal 102. A fiber-optics cable 103 may be used to couple circulator 122 to optics module 124. Optics module 124 may comprise optical components for adjusting the power levels of component signals of input signal 101. Electronics module 126 may comprise data acquisition and control components for monitoring and controlling the operation of optics module 124. It is to be noted that data acquisition and control, in general, are well known in the art and not further described here.

Figure 2B:
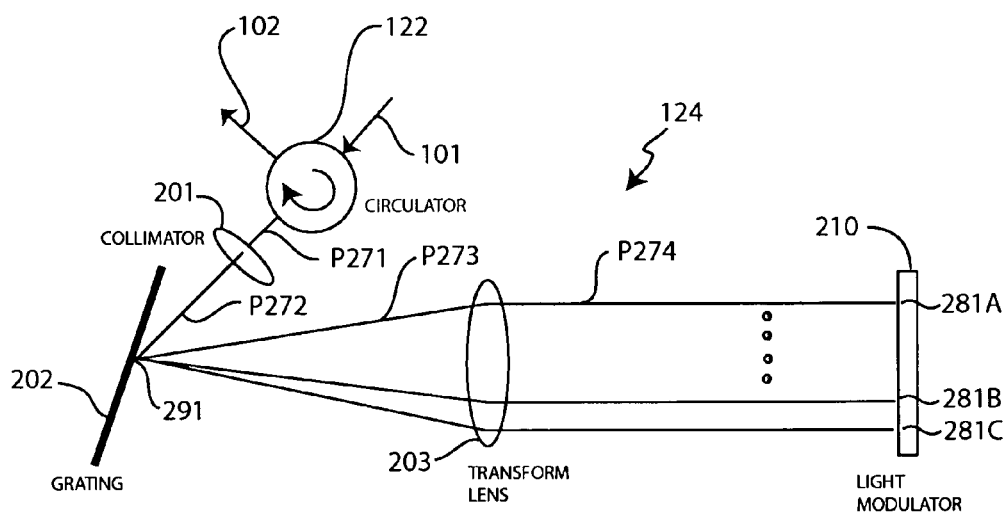
FIG. 2B schematically shows the components of an optics module of the dynamic gain equalizer of FIG. 1.

FIG. 2B schematically shows the components of an optics module 124. As shown in FIG. 2B, optics module 124 may include a collimator 201, a grating 202, a transform lens 203, and a light modulator 210. Collimator 201 may be a collimating lens configured to direct input signal 101 into a location 291 of grating 202, and to direct output signal 102 from location 291 into circulator 122.

In FIG. 2B, grating 202 is depicted as a reflective grating. However, depending on the application, grating 202 may also be a transmissive grating. Grating 202 may be a diffraction grating having about 1200 grooves per millimeter, for example. Grating 202 decomposes a signal (e.g., a DWDM signal) from collimator 201 into its wavelength component signals and combines wavelength component signals from transform lens 203. Effectively, grating 202 demultiplexes a signal coming from collimator 201 and multiplexes component signals coming from transform lens 203.

Transform lens 203 may be a Fourier Transform lens. Generally speaking, a transform lens converts angular information into positional information. In FIG. 2B, transform lens 203 is configured to direct and focus component signals from grating 202 to different locations on light modulator 210. Similarly, transform lens 203 is configured to direct each component signal reflected from each location on light modulator 210 to location 291 on grating 202.

Light modulator 210 may be a light modulator with micro electromechanical system (MEMS) components. Light modulator 210 may be a grating light valve (GLV) light modulator commercially available from Silicon Light Machines, Inc., for example. GLV-type devices are also described in the following disclosures, which are incorporated herein by reference in their entirety: U.S. Pat. No. 5,311,360 to Bloom et al.; U.S. Pat. No. 5,841,579 to Bloom et al.; and U.S. Pat. No. 5,661,592 to Bornstein et al.

Figure 3A:
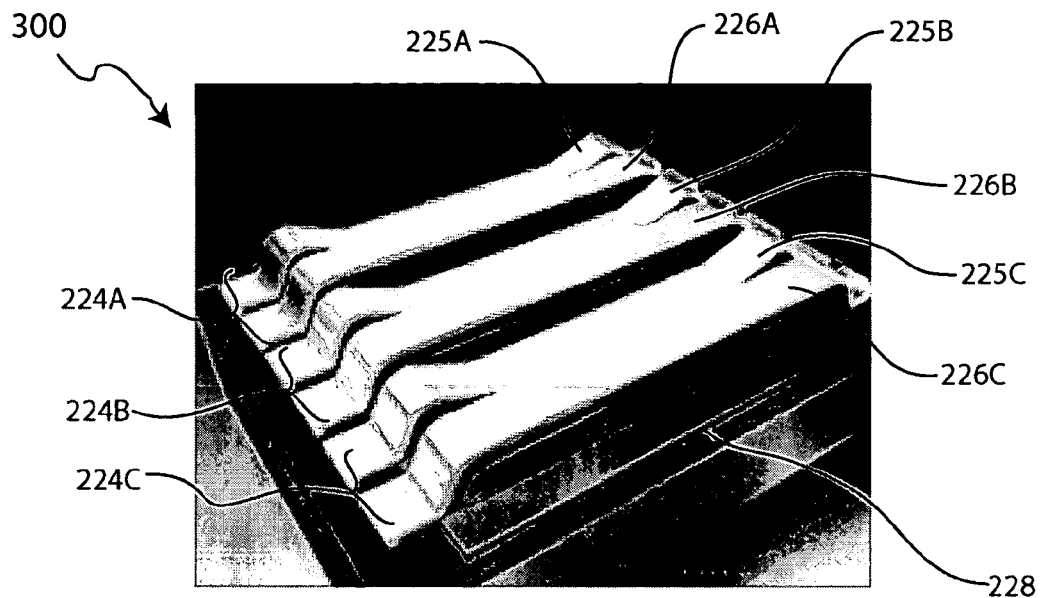
FIG. 3A schematically shows a grating light valve.

Referring to FIG. 3A, there is schematically shown an example GLV 300. GLV 300 comprises an array of ribbon pairs 224 (i.e., 224A, 224B, 224C). Each ribbon pair 224 comprises a fixed ribbon 226 (i.e., 226A, 226B, 226C) and a deflectable ribbon 225 (i.e., 225A, 225B, 225C). A ribbon may be a silicon nitride micro-structure coated with a reflective layer of aluminum. A ribbon may be about 200 nm to 300 nm thick, about 500 µm long, and about 10 µm wide. Ribbon pairs 224 may be fabricated using MEMS technology.

Ribbon pairs 224 are suspended above an air gap. Underneath ribbon pairs 224 is a common bottom electrode 228, which may be set at ground potential. Applying a bias voltage on a ribbon pair 224 results in an electrostatic force that attracts a deflectable ribbon 225 towards bottom electrode 228, thus deflecting the deflectable ribbon 225. A fixed ribbon 226 stays relatively taut and un-deformed during this time. Removing the bias voltage causes the deflectable ribbon 225 to spring back to its original un-deformed shape. The amount by which a ribbon 225 is deflected towards bottom electrode 228 depends on the applied bias voltage.

Figure 3B:
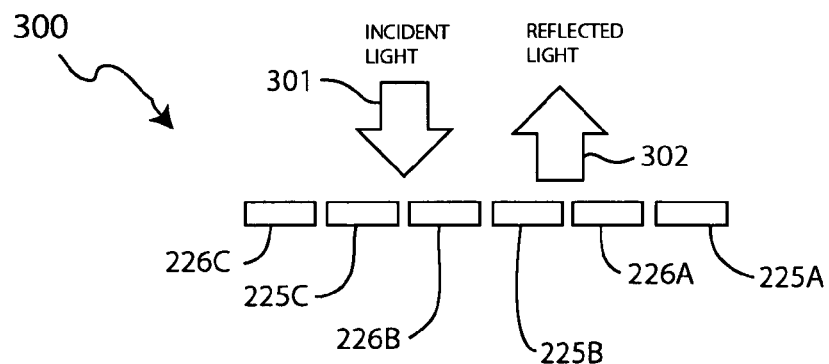
FIG. 3B schematically shows the grating light valve of FIG. 3A in specular state.

FIG. 3B schematically shows GLV 300 in a specular state, which is a state where no bias voltage is applied on ribbon pairs 224. In the specular state, deflectable ribbons 225 and fixed ribbons 226 are un-deflected, thereby causing an incident light 301 to reflect off the surface of the ribbons as a reflected light 302.

Figure 3C:
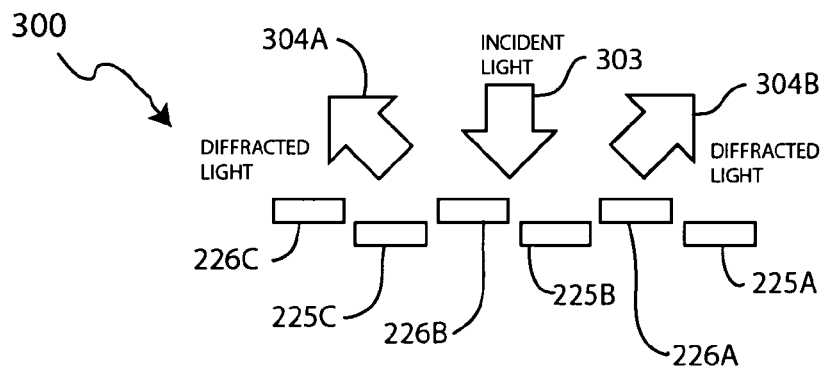
FIG. 3C schematically shows the grating light valve of FIG. 3A in diffraction state.

FIG. 3C schematically shows GLV 300 in a diffraction state, which is a state where a bias voltage is applied on ribbon pairs 224. In the diffraction state, deflectable ribbons 225 are deflected while fixed ribbons 226 remain relatively un-deflected. As shown in FIG. 3C, this causes portions of an incident light 303 to diffract off the surface of the ribbons as diffracted light 304 (i.e., 304A, 304B). Diffracted light 304 is not collected and is thus "dissipated". The remaining portions of incident light 303, if any, are reflected back. Thus, by controlling the bias voltage on ribbon pairs 224, the power level of light impinging on GLV 300 may be attenuated by diffraction as shown in FIG. 3C. Electronics module 126 (see FIG. 2A) may be employed as a closed-loop system to maintain a designated power level by controlling the applied bias voltage and monitoring the resulting power level of reflected light.

Referring back to FIG. 2B, the propagation of an input signal 101 through optics module 124 and back as output signal 102 is now described. In one embodiment, input signal 101 is a DWDM signal. Circulator 122 routes input signal 101 to collimator 201 along an optical path P271, which may comprise a fiber-optics cable (e.g., fiber-optics cable 103 shown in FIG. 2A) and a free-space path where the optical beam is diverging from the fiber end to collimator 201. Note that as used in the present disclosure, the term "optical path" or "path" includes free-space, fiber-optics cable, material, and other medium for propagating an optical signal.

As input signal 101 moves out of circulator 122 and into optical path P271, input signal 101 changes from a tightly bundled beam to a diverging beam. Collimator 201 then collimates and directs input signal 101 along an optical path P272 towards location 291 of grating 202. Grating 202 diffracts different wavelengths at different angles, thereby decomposing input signal 101 into its constituent component signals. Note that a DWDM input signal 101 will have several component signals of varying wavelengths. In FIG. 2B, the component signals of input signal 101 are labeled on light modulator 210 as component signals 281A, 281B, 281C, and so on. An input signal 101 may have as many as 100 (or more) component signals, with each component signal being a beam of light of a particular wavelength.

Still referring to FIG. 2B, a component signal 281 (i.e., 281A, 281B, . . . ) from grating 202 propagates along an optical path P273 towards transform lens 203. Because component signals 281 have different wavelengths, grating 202 will diffract each component signal 281 at a different angle. This results in component signals 281 impinging on different locations on transform lens 203. Transform lens 203 directs and focuses component signals 281 to different locations on light modulator 210. For example, transform lens 203 may direct and focus component signal 281A along optical path P274 towards GLV ribbon pairs (e.g., GLV 300 of FIG. 3A) of light modulator 210. Note that component signals 281 propagate towards light modulator 210 along different, substantially parallel optical paths (referred to as "telecentric"). Transform lens 203 thus allows different component signals 281 to impinge on different GLV ribbon pairs of light modulator 210, thereby allowing independent attenuation of each component signal 281. Note that light modulator 210 may comprise several GLV ribbon-pairs per component signal 281.

When a component signal 281 impinges on light modulator 210, the GLV ribbon-pairs for that component signal 281 may be controlled to either reflect the component signal in its entirety or to reflect the component signal partially by diffracting some or all of it. The un-diffracted portion of a component signal 281 reflected off light modulator 210 propagates back towards transform lens 203 along the same optical path as that of the incident component signal. That is, optics module 124 may be configured such that component signal 281A, for example, propagating towards light modulator 210 along optical path P274 is reflected back towards transform lens 203 also along optical path P274.

Component signals 281 reflected off light modulator 210 impinge on different locations on transform lens 203, which then directs component signals 281 towards location 291 on grating 202. Grating 202 effectively combines component signals 281 into a single collimated beam, which is focused by collimator 201 to the fiber end and then propagated back to circulator 122 as output signal 102. From circulator 122, output signal 102 propagates to the rest of the system (not shown), which may be a telecommunications network.

Because the efficiency of diffraction gratings and light modulators are relatively sensitive to the polarization state of incident light, polarization-dependent loss imposes a constraint in the design of an optical dynamic gain equalizer. In an embodiment of the present invention, the effects of polarization-dependent loss in an optical device, such as an optical dynamic gain equalizer, are mitigated by polarization diversity (see also U.S. application Ser. No. 10/051,972, entitled "Method And Apparatus For Dynamic Equalization In Wavelength Division Multiplexing", filed by Jahja I. Trisnadi et al. on Jan. 15, 2002, which is incorporated herein by reference in its entirety). Polarization diversity can be practically and efficiently realized by employing a polarization diversity module in accordance with an embodiment of the present invention. The polarization diversity module processes an input signal, regardless of its original polarization state, such that the inputs signal's component signals have the same polarization state. This allows light beams propagating through the optical device to have a single, uniform polarization state, resulting in a relatively more stable output signal and substantially polarization independent throughput.

Figure 4:
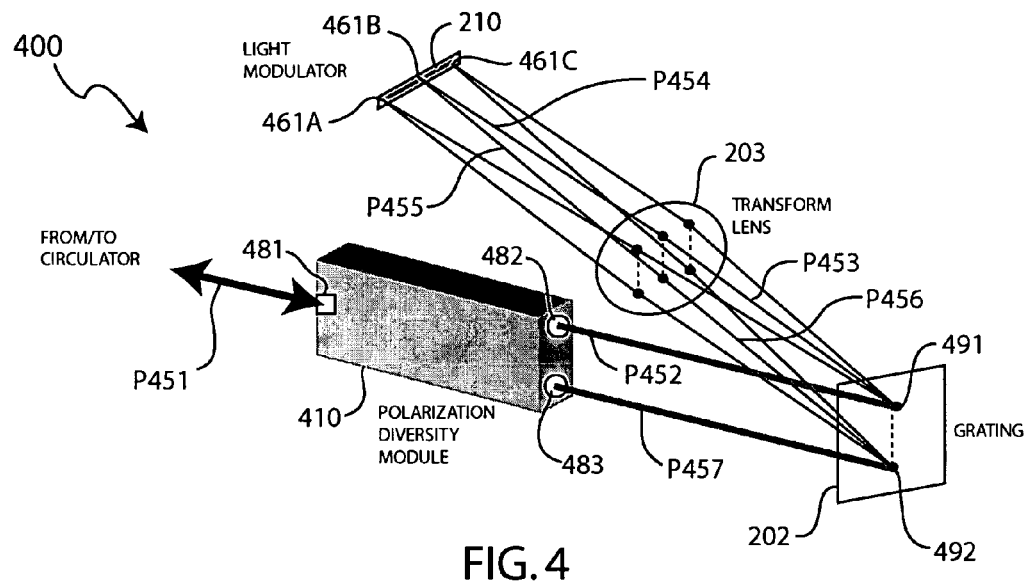
FIG. 4 schematically shows an optics module in accordance with an embodiment of the present invention.

FIG. 4 schematically shows an optics module 400 in accordance with an embodiment of the present invention. Optics module 400 comprises a grating 202, a transform lens 203, and a light modulator 210 that may be of the same type as those employed in optics module 124 of FIGS. 2A and 2B. Optics module 400 may be a part of a dynamic gain equalizer, such as dynamic gain equalizer 120. For example, optics module 400 may be employed in dynamic gain equalizer 120 instead of optics module 124. An electronics module (e.g., electronics module 126) for controlling the operation of optics module 400 and a circulator (e.g. circulator122) for routing signals into and out of optics module 400 are not shown in FIG. 4 for clarity of illustration.

As shown in FIG. 4, optics module 400 further includes a polarization diversity module 410. Diversity module 410 may be configured to receive an optical input signal on an optical path P451, and decompose the input signal into a first module output signal on an optical path P452 and a second module output signal on an optical path P457. Diversity module 410 may have ports 481, 482, and 483 for coupling to paths P451, P452, and P457, respectively. Path P451 may be a fiber-optics cable (e.g., fiber-optics cable 103 of FIG. 1) coupling a circulator 122 to diversity module 410. The optical input signal on path P451 may be a DWDM signal of unspecified polarization. Diversity module 410 processes the input signal on path P451 such that the resulting first module output signal and second module output signal have the same polarization state. For example, diversity module 410 may receive an input signal with an arbitrary polarization and output a first module output signal and a second module output signal that are both P-polarized or both S-polarized.

The first module output signal from port 482 propagates to a location 491 on grating 202, which then decomposes the first module output signal to its constituent component signals. Similarly, the second module output signal from port 483 propagates to a location 492 on grating 202, which then decomposes the second module output signal to its constituent component signals. Note that a DWDM input signal on path P451 will have several component signals, such as component signals 461 (i.e., 461A, 461B . . . ) labeled on light modulator 210, for example. As will be more apparent below, optics module 400 may be configured such that reflected component signals that originated from location 491 return to grating 202 on location 492, while reflected component signals that originated from location 492 return on location 491.

Grating 202 diffracts component signals 461 of the first module output signal and the second module output signal towards different, non-overlapping locations on transform lens 203. Transform lens 203 directs and focuses component signals 461 to different GLV ribbon pairs of light modulator 210. Un-diffracted portions of component signals 461 retrace the paths of the incoming component signals, but in reverse propagation directions. That is, the component signals are reflected off light modulator 210 towards different, non-overlapping locations on transform lens 203. Transform lens 203 then directs and focuses these returning component signals 461 towards one of two locations on grating 202; component signals 461 that originated from location 491 are directed towards location 492, while those that originated from location 492 are directed towards location 491. Grating 202 re-combines (i.e., re-multiplexes) these returning component signals 461 by diffracting them back towards diversity module 410. The re-combined signal from location 491 enter port 482, while the re-combined signal from location 492 enter port 483. Diversity module 410 further re-combines these signals back into an output signal that propagates out to the rest of the system, which may be a telecommunications networks.

Using component signal 461B as a specific example, grating 202 diffracts the first module output signal from port 482 into component signals 461A, 461B, 461C, and so on. Component signal 461B then propagates along an optical path P453 towards a location on transform lens 203. Transform lens 203 directs and focuses component signal 461B along an optical path P454 to impinge on light modulator 210. For example, component signal 461B may impinge on a GLV 300 shown in FIG. 3A. The un-diffracted portion of component signal 461B reflected off light modulator 210 propagates back towards transform lens 203 along an optical path P455. Transform lens 203 directs component signal 461B towards location 492 of grating 202 along an optical path P456. Grating 202 combines component signal 461B on path P456 with other component signals 461 propagating back towards location 492.

Component signals of the second module output signal on port 483 propagate through optics 400 along the same optical path traversed by component signals of the first module output signal, but in reverse. That is, component signal 461B of the second module output signal propagate from location 492 of grating 202 to paths P456, P455, P454, P453, and then to location 491 where component signals 461 are re-combined before going back to diversity module 410 along path P452. Diversity module 410 combines the returning first and second module output signals into an output signal that propagates out of port 481 and to the rest of the system.

Figure 5:
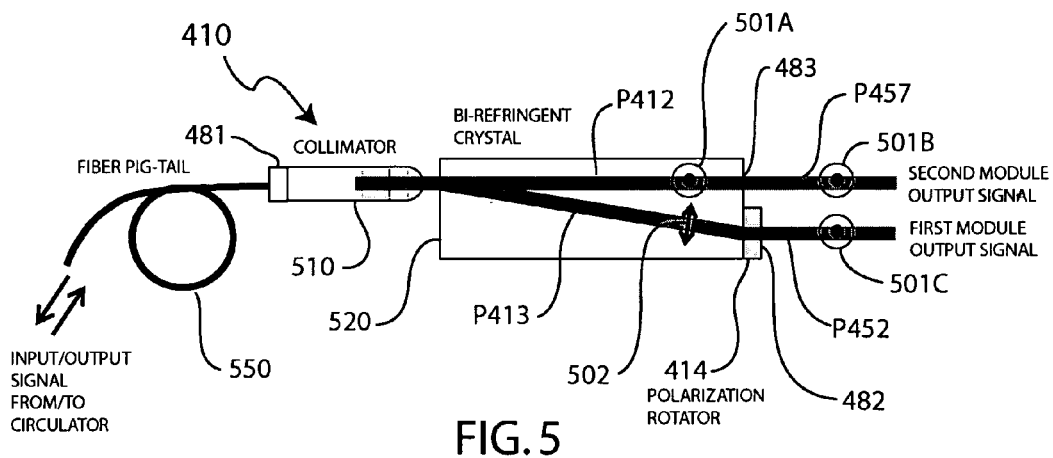
FIG. 5 schematically shows a polarization diversity module in accordance with an embodiment of the present invention.

Referring now to FIG. 5, there is schematically shown a polarization diversity module 410 in accordance with an embodiment of the present invention. As shown in FIG. 5, diversity module 410 may comprise a collimator 510, a bi-refringent crystal 520, and a polarization rotator 414. Optical signals may go in and out of diversity module 410 via a pig-tail 550 of a fiber-optics cable, which in turn may be coupled to a circulator (e.g., circulator 122 of FIG. 2A). Note that depending on the application, a circulator may also be integrated in diversity module 410.

An optical input signal may enter collimator 510 via pig-tail 550. Similarly, an optical output signal from collimator 510 may enter pig-tail 550 and propagate out to the rest of the system. Collimator 510 may be a collimating lens configured to direct an input signal into bi-refringent crystal 520, and to direct an output signal from bi-refringent crystal 520 into pig-tail 550.

In one embodiment, bi-refringent crystal 520 is configured to decompose an input signal from collimator 510 into two orthogonally polarized and spatially separated signals namely, a P-polarized signal on an optical path P412 and an S-polarized signal on an optical path P413. Bi-refringent crystal 520 may be an yttrium vanadate ($YVO_4$) crystal, for example. Note that in FIG. 5, symbols 501 (i.e., 501A, 501B, 501C) represent a P-polarized signal, while symbol 502 represents an S-polarized signal. Also note that in the present disclosure, a P-polarized signal and an S-polarized signal are identified with respect to the plane of incidence; a P-polarized signal is in parallel with the plane of incidence, whereas an S-polarized signal is perpendicular to the plane of incidence. The plane of incidence is formed by light beams impinging on, and light beams diffracted from, a grating 202.

A bi-refringent crystal, in general, is a doubly refracting material. That is, a bi-refringent crystal has two indices of refraction. Light entering a bi-refringent crystal along a direction not parallel to the optical axis of the crystal will be divided into two orthogonal beams propagating in different directions. Embodiments of the present invention take advantage of this property to spatially separate an optical input signal.

Still referring to FIG. 5, polarization rotator 414 may be coupled to bi-refringent crystal 520 to convert the S-polarized signal on path P413 to a P-polarized signal on path P452 (see also path P452 in FIG. 4). This allows the first module output signal on path P452 to have the same polarization state as the second module output signal on path P457 (see also path P457 in FIG. 4). In this example, both the first and second module output signals are P-polarized. Both of the module output signals may also be S-polarized by placing polarization rotator 414 in path P457 instead of in path P452. Polarization rotator 414 may be a half-wave plate, for example. A half-wave plate, in general, is an optical component that can be adjusted to rotate a polarization angle by 90 degrees. Thus, a half-wave plate converts an S-polarized signal to a P-polarized signal or vice versa.

From paths P452 and P457, the first and the second module output signals, respectively, propagate in optics module 400 (see FIG. 4) as previously explained.

It is to be noted that a P-polarized input signal going into port 481 of optics module 400 will come out of port 483 as a P-polarized second module output signal, while an S-polarized input signal going into port 481 will come out of port 482 as a P-polarized first module output signal. An arbitrarily polarized input signal going into port 481 will be split into two spatially separated beams that are both P-polarized as discussed above. P-polarized signals coming back to bi-refringent crystal 520 through port 482, port 483, or both are re-combined as an output signal on port 481 and propagate back to the rest of the system. Preferably, to minimize variations in the output signal coming out of port 481, the first and second module output signals are optically processed in substantially identical fashion in optics module 400.

As can be appreciated from the foregoing, the first and second module output signals of diversity module 410 will have the same polarization state regardless of the polarization state of an input signal entering the diversity module. Advantageously, this ensures that light beams propagating in optics module 400 will have the same polarization state, thereby mitigating the effects of polarization dependent loss.

The optical components of diversity module 410, such as collimator 510, bi-refringent crystal 520, and polarization rotator 414 are preferably, but not necessarily, micro-optical components. Micro-optical components are substantially smaller than regular size optical components, and are thus advantageously more compact. Micro-optical components are commercially available from various manufacturers including Koncent Communications, Inc. of China. Micro-optical implementation is based on very mature technology and has been proven to meet the very stringent requirements of the optical communication industries (such as Telcordia standards). For example, a polarization diversity module 410 with micro-optical components may be fabricated in accordance with an embodiment of the present invention to conform to the following specifications:
  a) operable in telecommunication wavelengths of 1525 nm to 1570 nm (C-band);
  b) a first module output signal and a second module output signal with optics axis that are parallel to each other;
  c) a first module output signal and a second module output signal having a beam diameter of 1.6 mm ($e^{-2}$);
  d) a first module output signal and a second module output signal having a beam center-to-center separation of 2.5 mm; and
  e) a first module output signal and a second module output signal that are both P-polarized.

Figure 6:
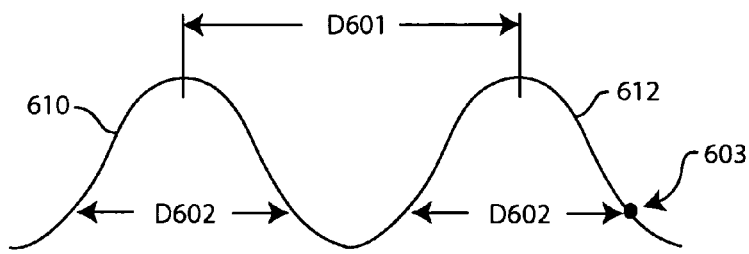
FIG. 6 schematically shows module output signals in accordance with an embodiment of the present invention.

FIG. 6 schematically shows a first module output signal 610 and a second module output signal 612 in accordance with an embodiment of the present invention. First module output signal 610 may be an output of diversity module 410 coming out of port 482, while second module output signal 612 may be an output of diversity module 410 coming out of port 483. In FIG. 6, a dimension D601 represents the separation between the beams of signals 610 and 612. As mentioned, dimension D601 may be 2.5 mm. A dimension D602 represents beam diameter as measured at a point 603, which may be a point where the amplitude of the beam is 13.5% of peak amplitude. As mentioned, dimension D602 may be 1.6 mm.

While specific embodiments of the present invention have been provided, it is to be understood that these embodiments are for illustration purposes and not limiting. Many additional embodiments will be apparent to persons of ordinary skill in the art reading this disclosure. Thus, the present invention is limited only by the following claims.

What is claimed is:

1. An apparatus for adjusting power levels of optical signals, the apparatus comprising:
 a polarization diversity module configured to receive an input optical signal and output a first optical output signal and a second optical output signal, the first and second optical output signals having a same polarization state, the first optical output signal and the second optical output signal having a beam center-to-center separation of about 2.5 mm and a beam diameter of about 1.6 mm as measured at about 13.5% peak amplitude of the beam;
 a diffraction grating configured to decompose the first optical output signal to constituent first set of component signals and the second optical output signal to constituent second set of component signals; and
 a light modulator configured to receive and modulate the first set of component signals and the second set of component signals to a predetermined power level.

2. The apparatus of claim 1 further comprising:
 a collimator configured to direct the optical input signal to a component of the polarization diversity module.

3. The apparatus of claim 1 wherein the polarization diversity module further comprises:
 a bi-refringent crystal; and
 a polarization rotator configured to change a polarization state of an optical output signal of the bi-refringent crystal such that the first and second optical output signals of the polarization diversity module have the same polarization state.

4. The apparatus of claim 3 wherein the polarization rotator comprises a half-wave plate.

5. The apparatus of claim 3 wherein the bi-refringent crystal comprises a yttrium vanadate ($YVO_4$) crystal.

6. The apparatus of claim 1 wherein the light modulator comprises a grating light valve.

7. The apparatus of claim 1 wherein the light modulator comprises a micro electromechanical system (MEMS) component.

8. The apparatus of claim 7 wherein the MEMS component comprises an array of deflectable ribbon structures configured to reflect or diffract incident light.

9. A method of mitigating an effect of polarization-dependent loss in an optical device, the method comprising:
 spatially separating an input light beam into a first output light beam and a second output light beam, the first output light beam and the second output light beam having a beam center-to-center separation of about 2.5 mm and a beam diameter of about 1.6 mm as measured at about 13.5% of peak amplitude of the beam;
 rotating a polarization state of the first output light beam such that the first output light beam and the second output light beam have a same polarization state; and
 impinging at least the first output light beam on a light modulator.

10. The method of claim 9 further comprising:
 collimating the input light beam prior to spatially separating the input light beam.

11. The method of claim 9 further comprising:
 diffracting at least the first output light beam towards the light modulator.

12. The method of claim 9 further comprising:
 passing at least the first output light beam through a transform lens.

13. The method of claim 9 wherein the light modulator comprises a grating light valve.

14. The method of claim 9 wherein spatially separating the input light beam comprises passing the input light beam through a bi-refringent crystal.

* * * * *